US012738054B2

(12) United States Patent
Baughman et al.

(10) Patent No.: US 12,738,054 B2
(45) Date of Patent: Sep. 15, 2026

(54) GENERATION OF ASSOCIATIONS BETWEEN PHYSICAL AND VIRTUAL ENVIRONMENTS

(71) Applicant: International Business Machines Corporation, Armonk, NY (US)

(72) Inventors: Aaron K. Baughman, Cary, NC (US); Jeremy R. Fox, Georgetown, TX (US); Tushar Agrawal, West Fargo, ND (US); Sarbajit Kumar Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 126 days.

(21) Appl. No.: 18/627,782

(22) Filed: Apr. 5, 2024

(65) Prior Publication Data

US 2025/0316080 A1 Oct. 9, 2025

(51) Int. Cl.
*G06V 20/20* (2022.01)
*G06V 10/82* (2022.01)
*G06V 20/62* (2022.01)

(52) U.S. Cl.
CPC .............. *G06V 20/20* (2022.01); *G06V 10/82* (2022.01); *G06V 20/63* (2022.01)

(58) Field of Classification Search
CPC ...... G06T 19/006; G06V 20/20; G06V 20/63; G06V 10/82
See application file for complete search history.

(56) References Cited

U.S. PATENT DOCUMENTS 8,386,918 B2 2/2013 Do
8,831,255 B2 * 9/2014 Crawford ................ H04S 7/306 381/26
9,191,764 B2 11/2015 Baughman
(Continued)

FOREIGN PATENT DOCUMENTS

CN 105981411 B 11/2018
JP 5747490 A 7/2015
(Continued)

OTHER PUBLICATIONS

Hoxha, Retrieving Images With Generated Textual Descriptions, 2019, IEEE Xplore, pp. 5812-5815 (Year: 2019).*
(Continued)

*Primary Examiner* — Devona E Faulk
*Assistant Examiner* — Erica G Therkorn
(74) *Attorney, Agent, or Firm* — CHIP LAW GROUP

(57) ABSTRACT

Embodiments related to generation of associations between a physical environment and a digital environment are provided. A relationship feature-set is extracted for each of a first scene of the physical environment and a second scene of the digital environment. The relationship feature-set includes a subject, a predicate and an object, for each of the first scene and the second scene. The first scene is represented by a first tuple and the second scene is represented by a second tuple. The first tuple and the second tuple are used to generate a graph network, which is used to determine an adjacency of the first tuple and the second tuple in the graph network. The adjacency is used to calculate an association between the first scene and the second scene. An output is generated based on the association.

18 Claims, 8 Drawing Sheets

(56) References Cited

U.S. PATENT DOCUMENTS

| | | | | |
|---|---|---|---|---|
| 9,690,782 | B2 * | 6/2017 | Vukosavljevic | G06F 40/103 |
| 9,891,884 | B1 | 2/2018 | Baughman | |
| 10,888,270 | B2 | 1/2021 | Abrahami | |
| 10,922,716 | B2 | 2/2021 | Hiranandani | |
| 11,145,123 | B1 * | 10/2021 | Chor | G06F 3/147 |
| 11,978,248 | B1 * | 5/2024 | Blechschmidt | G06F 18/22 |
| 2011/0093479 | A1 * | 4/2011 | Fuchs | G06F 40/205 707/E17.061 |
| 2019/0377538 | A1 | 12/2019 | Jones | |
| 2022/0392171 | A1 | 12/2022 | Baughman | |

FOREIGN PATENT DOCUMENTS

| | | | | |
|---|---|---|---|---|
| WO | 2023049470 | A1 | 3/2023 | |
| WO | WO-2024021334 | A1 * | 2/2024 | G06F 40/211 |

OTHER PUBLICATIONS

Oates, "Flickr Commons: About Content Type and Advanced Search", Oct. 6, 2023, https://web.archive.org/web/20231006035619/https://www.flickr.org/flickr-commons-about-content-type-on-flickr-com/. Accessed Nov. 21, 2025 (Year: 2023).*

Tahara et al., "Retargetable AR: Context-aware Augmented Reality in Indoor Scenes based on 3D Scene Graph," Aug. 18, 2020, Sony Corportation, pp. 1-11 (Year: 2020).*

R. Giurda, et al., "Audio Services for Product Shopping," IP.com No. IPCOM000264989D, IP.com Electronic Publication Date: Feb. 15, 2021, 6 pages.

De et al., "On Performance Improvement Issues in Unordered Tuple Space based Mobile Middleware", Department of Computer Science and Engineering, Indian Institute of Technology Guwahati, India, 5 pages.

Dia et al.' "Fast SPARQL Join Processing between Distributed Streams and Stored RDF Graphs Using Bloom Filters" 12 pages.

Luo at al., "Gaussian Process Models for Hrtf Based 3D Sound Localization", 2014 IEEE International Conference on Acoustic, Speech and Signal Processing (ICASSP), 5 pages.

Platonov et al., "Automatic contour model creation out of polygonal CAD models for markerless Augmented Reality", Proceedings of the 2007 6th IEEE and ACM International Symposium on Mixed and Augmented Reality, Nov. 13, 2007, pp. 1-4.

Qian at al., "Binaural Sound Source Localization based on Neural Networks in Mismatched HRTF Condition", ICCAI '22: Proceedings of the 8th International Conference on Computing and Artificial Intelligence, Mar. 2022, pp. 62-67.

Vera et al., "A model for in-situ augmented reality content creation based on storytelling and gamification", Proceedings of the 6th Mexican Conference on Human-Computer Interaction, Sep. 21, 2016, pp. 39-42.

* cited by examiner

GENERATION OF ASSOCIATIONS BETWEEN PHYSICAL AND VIRTUAL ENVIRONMENTS

BACKGROUND

The present disclosure relates generally to computer vision, and more specifically, to determination of association between an extended reality environment and a physical environment.

With advancements in computer vision technology, users are now experiencing immersive and interactive digital environments, such as those found in extended reality (XR) environments. An XR environment combines elements of the physical and virtual environments, offering users interactive and immersive experiences. The increasing adoption of immersive and interactive experiences has led to mixing of the physical and virtual environments to provide rich information experiences to users.

However, the problem of human inverse base-rate effect from attention theory states that when multiple environments or variables are combined that have already been learned, humans tend to pick the rare outcome. This means that when humans learn simple outcomings from two different environments, they relate common outcomes to each. When they are combined, they pick the rare event. This poses difficulties in rendering accurate information in mixed environment scenarios.

Thus, there is a need to overcome aforementioned problems.

SUMMARY

According to one or more embodiments of the present disclosure, a computer-implemented method is provided, which includes obtaining, by a computer, one or more images associated with a first scene in a physical environment and a second scene in a digital environment. Further, textual information for each of the first scene and the second scene is extracted. A relationship feature-set for each of the first scene and the second scene is determined based on the extracted textual information, the relationship feature-set comprising at least a subject, a predicate and an object, for each of the first scene and the second scene. A first tuple for the first scene and a second tuple for the second scene is generated based on the relationship feature-set. An association between the first scene and the second scene is determined based on a function associated with the first tuple and the second tuple. The determined association is used to generate an output.

According to one or more embodiments of the present disclosure, a system comprising a processor set is provided. The processor is configured to obtain one or more images associated with a first scene in a physical environment and a second scene in a digital environment. For each of the first scene and the second scene, textual information is extracted. A relationship feature-set for each of the first scene and the second scene is extracted based on the extracted textual information. The relationship feature-set comprises at least a subject, a predicate and an object, for each of the first scene and the second scene. Based on the relationship feature-set, a first tuple and a second tuple is determined. Further, an association between the first tuple and second tuple is calculated based on a function associated with the first tuple and the second tuple. The association is used to generate an output.

According to one or more embodiments of the present disclosure, a computer program product is provided. The computer program product comprises a computer readable storage medium having program instructions embodied therewith, the program instructions executable by a computer to configure the computer for obtaining one or more images associated with a first scene in a physical environment and a second scene in a digital environment. The computer is also configured for extracting textual information for each of the first scene and the second scene. A relationship feature-set for each of the first scene and the second scene is determined based on the extracted textual information. The relationship feature-set comprises at least a subject, a predicate and an object, for each of the first scene and the second scene. The relationship feature-set is used for determining a first tuple for the first scene and a second tuple for the second scene. An association between the first scene and the second scene is calculated based on a function associated with the first tuple and the second tuple. The association is used to generate an output.

Additional technical features and benefits are realized through the techniques of the present disclosure. Embodiments and aspects of the disclosure are described in detail herein and are considered a part of the claimed subject matter. For a better understanding, refer to the detailed description and to the drawings.

BRIEF DESCRIPTION OF THE DRAWINGS

The following description will provide details of preferred embodiments with reference to the following figures wherein.

DETAILED DESCRIPTION

Figure 1:
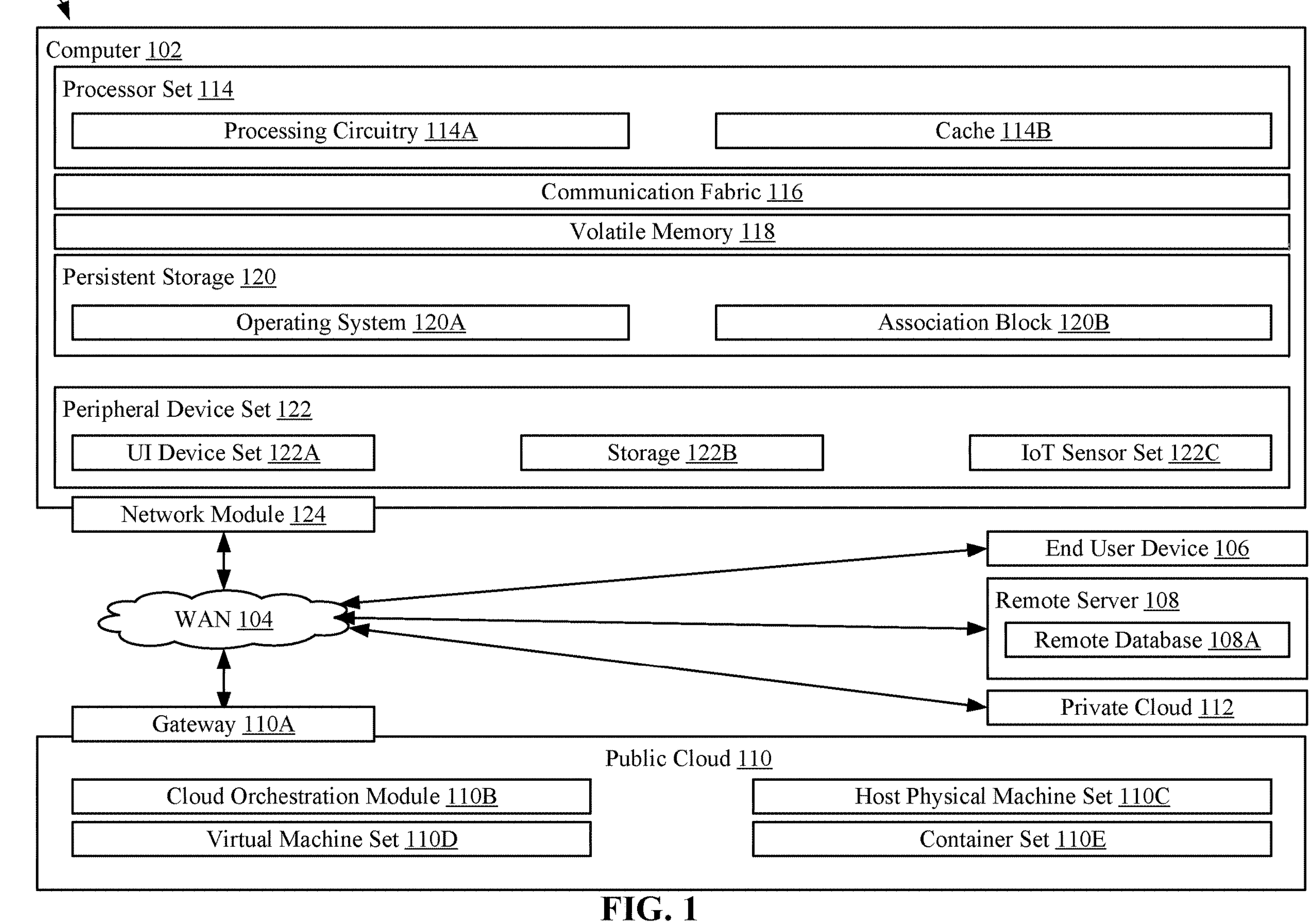
FIG. 1 is a block diagram illustrating a computing environment for relationship activation between a physical environment and a virtual environment, in accordance with an embodiment of the present disclosure.

Widespread use and adoption of mixed reality technologies has led to development of new technologies for digital rendering and digital projections, involving technologies for understanding and inference of physical environments and digital environments. Mixed reality is a term that encompasses technologies including, but not limited to augmented reality (AR), virtual reality (VR), extended reality (XR), and the like. The use and adoption of mixed reality technologies spans across myriad domains including but not limited to gaming, education, sports, fitness, collaborative communications, IoT based smart solutions, shopping and commerce, and the like.

For example, at a sporting event or during everyday activity, digital projections in a digital environment corresponding to the physical environment, through mixed reality or augmented reality can provide user assistance or understanding of the physical environment. The digital projections are activated through active human interaction or by algorithmic trigger detection. For example, an algorithm could detect the identity of an object which is then used to retrieve historical information about the object to be overlayed onto the physical environment. The mixing of the two mediums—the physical environment and the digital environment can provide rich information for users, such as those who are in the physical environment and are also experiencing the digital environment through a user device.

One challenge with mixing the physical environment and the digital environment is related to human inverse base-rate effect from attention theory. According to the human inverse base-rate effect, when multiple environments or variables are combined that have already been learned, humans tend to pick the rare outcome. This problem means that when humans learn simple outcomings from two different environments, they relate common outcomes to each. When they are combined, they pick the rare event. This could lead to errors in rendering of digital data or errors in overlayed information in the digital environment, for a corresponding physical environment or physical event. This leads to a problem of disconnect between the physical environment and the digital environment, specifically during rendering of information on a mixed reality device. The mixed reality device may be any of an augmented reality (AR) device, a virtual reality (VR) device, and an extended reality (XR) device.

For example, in a building with different rooms, each room may be a different environment which may be learned as a physical environment and as a digital environment. In one or more embodiments of the present disclosure, tuples are used to create relationships between objects to bridge the gap in association between the physical environment and the digital environment.

In one or more embodiments of the present disclosure, this problem is overcome by generating an association between the physical environment and the digital environment using relationship feature-sets, comprising subject, predicate, and object relationships.

In one or more embodiments of the present disclosure, these relationship-feature sets are used to generate a graph network, which is used to determine adjacency between semantic tuples of the physical environment and the digital environment, in order to form strong associations between events of the physical environment and the digital environment.

In one or more embodiments of the present disclosure, a method for directing the attention of the user of an augmented reality system to relevant information is provided, thereby and preventing the user from getting distracted by irrelevant information. This is done by generating associations between the physical environment and the digital environment based on relationship feature-sets comprising a subject, an object, and a predicate based tuple in each relationship feature-set. These relationship feature-sets are used to form tuples corresponding to each of the physical environment and the digital environment, which are then used for linking the physical environment and the digital environment and evaluating this information for relevance for the user.

In one or more embodiments, the most relevant information is transformed into speech and a special sound is used to signal the importance of the information.

In one or more embodiments of the present disclosure, a computer-implemented method is provided. The computer-implemented method includes obtaining one or more images associated with a first scene in a physical environment and a second scene in a digital environment. Textual information for each of the first scene and the second scene extracted and is used to determine a relationship feature-set for each of the first scene and the second scene based. The relationship feature-set comprises at least a subject, a predicate and an object, for each of the first scene and the second scene. The relationship feature-set is used to determine a first tuple for the first scene and a second tuple for the second scene. The first tuple and the second tuple are used for calculating an association between the first scene and the second scene based on a function associated with the first tuple and the second tuple. The determined association is used to generate an output which negates the inverse base rate effect and provides a strong association between the physical environment and the digital environment.

In one or more embodiments of the present disclosure, a graph network is generated based on the first tuple and the second tuple. The graph network is used for calculating the association between the first scene and the second scene based on the function comprising an adjacency value associated with the first tuple and the second tuple in the graph network.

In one or more embodiments of the present disclosure, the function associated with the first tuple and the second tuple comprises a set of ordered triples. Each triple of the set of ordered triples is of a form (o1, o2, w), where o1 is a physical object of the physical environment, o2 is a virtual object of the digital environment, and w is a weight parameter, and wherein each triple of the form (o1, o2, w) indicates that a relationship R exists from the physical object o1 to the virtual object o2 with a weight corresponding to the weight parameter w. This helps to establish strong relationships between physical objects of the physical environment and digital objects of the digital environment.

In one or more embodiments of the present disclosure, a computer vision model is executed for extracting the textual information for each of the first scene and the second scene. The computer vision model comprises either a convolutional neural network model, a feature pyramidal extraction model, or a large video model.

In one or more embodiments of the present disclosure, the output is rendered as overlay data on a display interface associated with the digital environment. This helps in directing user's attention to relevant information only.

In one or more embodiments of the present disclosure, the overlay data comprises a natural language text output which is easy and intuitive for the user and thus helps in capturing user's attention to relevant information.

In one or more embodiments of the present disclosure, the overlay data comprises binaural sound which effectively captures user's attention and helps in mitigating the effects of inverse based rate effect.

In one or more embodiments of the present disclosure, the display interface is associated with an extended reality device such as an AR/VR headset, AR/VR glasses, and the like.

In one or more embodiments of the present disclosure, the first tuple and the second tuple are stored in a graph database for effectively calculating associations between the tuples.

In one or more embodiments of the present disclosure, a system is provided. The system comprises a processor set configured to obtain one or more images associated with a first scene in a physical environment and a second scene in a digital environment. The system is also configured to extract textual information for each of the first scene and the second scene and determine a relationship feature-set for each of the first scene and the second scene based on the extracted textual information. The relationship feature-set comprises at least a subject, a predicate and an object, for each of the first scene and the second scene. The system is further configured to determine a first tuple for the first scene and a second tuple for the second scene, based on the relationship feature-set. The system is also configured to calculate an association between the first scene and the second scene based on a function associated with the first tuple and the second tuple and to generate an output based on the association.

In one or more embodiments of the present disclosure, a computer program product comprising a computer readable storage medium having program instructions embodied therewith is provided. The computer program product comprising a computer readable storage medium having program instructions embodied therewith, the program instructions executable by a computer to configure the computer for obtaining one or more images associated with a first scene in a physical environment and a second scene in a digital environment. The computer is also configured for extracting textual information for each of the first scene and the second scene. The computer is also configured for determining a relationship feature-set for each of the first scene and the second scene based on the extracted textual information. The relationship feature-set comprises at least a subject, a predicate and an object, for each of the first scene and the second scene. The computer is also configured for determining a first tuple for the first scene and a second tuple for the second scene, based on the relationship feature-set. The computer is also configured for calculating an association between the first scene and the second scene based on a function associated with the first tuple and the second tuple and generating an output based on the association.

One or more embodiments of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

FIG. 1 is a block diagram that illustrates a computing environment 100 for determining association between a physical environment and a digital environment, in accordance with an embodiment of the disclosure. With reference to FIG. 1, there is shown a computing environment 100 that contains an example of an environment for the execution of at least some of the computer code involved in performing the inventive methods, such as an association block 120B. In addition to the association block 120B, computing environment 100 includes, for example, a computer 102, a wide area network (WAN) 104, an end user device (EUD) 106, a remote server 108, a public cloud 110, and a private cloud 112. In this embodiment, the computer 102 includes a processor set 114 (including a processing circuitry 114A and a cache 114B), a communication fabric 116, a volatile memory 118, a persistent storage 120 (including an operating system 120A and an association block 120B, as identified above), a peripheral device set 122 (including a user interface (UI) device set 122A, a storage 122B, and an Internet of Things (IoT) sensor set 122C), and a network module 124. The remote server 108 includes a remote database 108A. The public cloud 110 includes a gateway 110A, a cloud orchestration module 110B, a host physical machine set 110C, a virtual machine set 110D, and a container set 110E.

The computer 102 may take the form of a desktop computer, a laptop computer, a tablet computer, a smartphone, a smartwatch or other wearable computer, a mainframe computer, a quantum computer, or any other form of a computer or a mobile device now known or to be developed in the future that is capable of running a program, accessing a network, or querying a database, such as the remote database 108A. As is well understood in the art of computer related technologies, and depending upon the technology, the performance of a computer-implemented method may be distributed among multiple computers and/or between multiple locations. On the other hand, in this presentation of the computing environment 100, detailed discussion is focused on a single computer, specifically the computer 102, to keep the presentation as simple as possible. The computer 102 may be located in a cloud, even though it is not shown in a cloud in FIG. 1. On the other hand, computer 102 is not required to be in a cloud except to any extent as may be affirmatively indicated.

The processor set 114 includes one, or more, computer processors of any type now known or to be developed in the future. The processing circuitry 114A may be distributed over multiple packages, for example, multiple, coordinated integrated circuit chips. The processing circuitry 114A may implement multiple processor threads and/or multiple processor cores. The cache 114B may be memory that is located in the processor chip package(s) and is typically used for data or code that should be available for rapid access by the threads or cores running on the processor set 114. Cache memories are typically organized into multiple levels depending upon relative proximity to the processing circuitry 114A. Alternatively, some, or all, of the cache 114B for the processor set 114 may be located "off-chip." In some computing environments, the processor set 114 may be designed for working with qubits and performing quantum computing.

Computer readable program instructions are typically loaded onto the computer 102 to cause a series of operational steps to be performed by the processor set 114 of the computer 102 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as the cache 114B and the other storage media discussed below. The program instructions, and associated data, are accessed by the processor set 114 to control and direct performance of the inventive methods. In computing environment 100, at least some of the instructions for performing the inventive methods may be stored in the association block 120B in persistent storage 120.

The communication fabric 116 is the signal conduction path that allows the various components of computer 102 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

The volatile memory 118 is any type of volatile memory now known or to be developed in the future. Examples include dynamic type random access memory (RAM) or static type RAM. Typically, the volatile memory 118 is characterized by a random access, but this is not required unless affirmatively indicated. In the computer 102, the volatile memory 118 is located in a single package and is internal to computer 102, but, alternatively or additionally, the volatile memory 118 may be distributed over multiple packages and/or located externally with respect to computer 102.

The persistent storage 120 is any form of non-volatile storage for computers that is now known or to be developed in the future. The non-volatility of this storage means that the stored data is maintained regardless of whether power is being supplied to computer 102 and/or directly to the persistent storage 120. The persistent storage 120 may be a read-only memory (ROM), but typically at least a portion of the persistent storage 120 allows writing of data, deletion of data, and re-writing of data. Some familiar forms of the persistent storage 120 include magnetic disks and solid-state storage devices. The operating system 120A may take several forms, such as various known proprietary operating systems or open-source Portable Operating System Interface-type operating systems that employ a kernel. The association block 120B typically includes at least some of the computer code involved in performing the inventive methods.

The peripheral device set 122 includes the set of peripheral devices of computer 102. Data communication connections between the peripheral devices and the other components of computer 102 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, the UI device set 122A may include components such as a display screen, speaker, microphone, wearable devices (such as goggles and smartwatches), keyboard, mouse, printer, touchpad, game controllers, and haptic devices. The storage 122B is external storage, such as an external hard drive, or insertable storage, such as an SD card. The storage 122B may be persistent and/or volatile. In some embodiments, storage 122B may take the form of a quantum computing storage device for storing data in the form of qubits. In embodiments where computer 102 is required to have a large amount of storage (for example, where computer 102 locally stores and manages a large database) then this storage may be provided by peripheral storage devices designed for storing very large amounts of data, such as a storage area network (SAN) that is shared by multiple, geographically distributed computers. The IoT sensor set 122C is made up of sensors that can be used in Internet of Things applications. For example, one sensor may be a thermometer and another sensor may be a motion detector.

The network module 124 is the collection of computer software, hardware, and firmware that allows computer 102 to communicate with other computers through WAN 104. The network module 124 may include hardware, such as modems or Wi-Fi signal transceivers, software for packetizing and/or de-packetizing data for communication network transmission, and/or web browser software for communicating data over the internet. In some embodiments, network control functions, and network forwarding functions of the network module 124 are performed on the same physical hardware device. In other embodiments (for example, embodiments that utilize software-defined networking (SDN)), the control functions and the forwarding functions of the network module 124 are performed on physically separate devices, such that the control functions manage several different network hardware devices. Computer readable program instructions for performing the inventive methods can typically be downloaded to computer 102 from an external computer or external storage device through a network adapter card or network interface included in the network module 124.

The WAN 104 is any wide area network (for example, the Internet) capable of communicating computer data over non-local distances by any technology for communicating computer data, now known or to be developed in the future. In some embodiments, the WAN 104 may be replaced and/or supplemented by local area networks (LANs) designed to communicate data between devices located in a local area, such as a Wi-Fi network. The WAN 104 and/or LANs typically include computer hardware such as copper transmission cables, optical transmission fibres, wireless transmission, routers, firewalls, switches, gateway computers, and edge servers.

The End User Device (EUD) 106 is any computer system that is used and controlled by an end user (for example, a customer of an enterprise that operates computer 102) and may take any of the forms discussed above in connection with computer 102. The EUD 106 typically receives helpful and useful data from the operations of computer 102. For example, in a hypothetical case where computer 102 is designed to provide a recommendation to an end user, this recommendation would typically be communicated from the network module 124 of computer 102 through WAN 104 to EUD 106. In this way, the EUD 106 can display, or otherwise present, the recommendation to an end user. In some embodiments, EUD 106 may be a client device, such as a thin client, heavy client, mainframe computer, desktop computer, and so on.

The remote server 108 is any computer system that serves at least some data and/or functionality to the computer 102. The remote server 108 may be controlled and used by the same entity that operates the computer 102. The remote server 108 represents the machine(s) that collect and store helpful and useful data for use by other computers, such as the computer 102. For example, in a hypothetical case where the computer 102 is designed and programmed to provide a recommendation based on historical data, then this historical data may be provided to the computer 102 from the remote database 108A of the remote server 108.

The public cloud 110 is any computer system available for use by multiple entities that provides on-demand availability of computer system resources and/or other computer capabilities, especially data storage (cloud storage) and computing power, without direct active management by the user. Cloud computing typically leverages the sharing of resources to achieve coherence and economies of scale. The direct and active management of the computing resources of the public cloud 110 is performed by the computer hardware and/or software of the cloud orchestration module 110B. The computing resources provided by the public cloud 110 are typically implemented by virtual computing environments that run on various computers making up the computers of the host physical machine set 110C, which is the universe of physical computers in and/or available to the public cloud 110. The virtual computing environments (VCEs) typically take the form of virtual machines from the virtual machine set 110D and/or containers from the container set 110E. It is understood that these VCEs may be stored as images and may be transferred among and between the various physical machine hosts, either as images or after the instantiation of the VCE. The cloud orchestration module 110B manages the transfer and storage of images, deploys new instantiations of VCEs, and manages active instantiations of VCE deployments. The gateway 110A is the collection of computer software, hardware, and firmware that allows public cloud 110 to communicate through WAN 104.

Virtualized computing environments (VCEs) can be stored as "images". A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

The private cloud 112 is similar to public cloud 110, except that the computing resources are only available for use by a single enterprise. While the private cloud 112 is depicted as being in communication with the WAN 104, in other embodiments a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, the public cloud 110 and the private cloud 112 are both part of a larger hybrid cloud.

In one or more embodiments of the present disclosure, the computer 102 is used to determine associations between a physical environment and a digital environment and to generate an output based on this association in such a manner that effects of the inverse base rate effect are mitigated. For example, the output may comprise binaural sound to reinforce the relationship between the physical environment and the digital environment.

Figure 2:
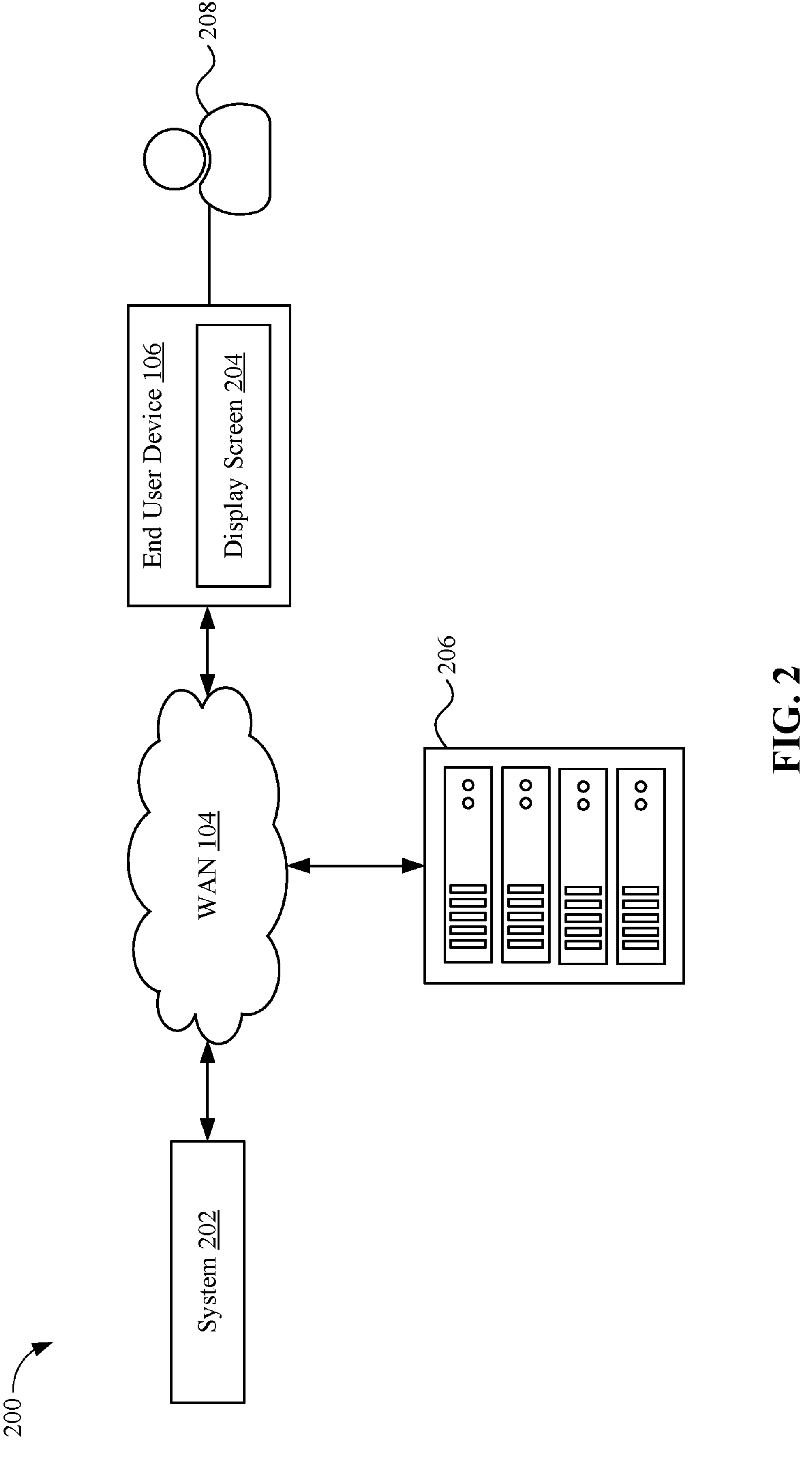
FIG. 2 is a block diagram of an environment for relationship activation between a physical environment and a virtual environment, in accordance with an embodiment of the present disclosure.

FIG. 2 is a block diagram that illustrates an environment for calculation association between a physical environment and a digital environment, in accordance with an embodiment of the disclosure. FIG. 2 is explained in conjunction with elements from FIG. 1. With reference to FIG. 2, there is shown a diagram of a network environment 200. The network environment 200 includes a system 202, a display screen 204, a server 206, and a user 208, The network environment 200 may further include the EUD 106, and the WAN 104 of FIG. 1. The system 202 may be an example of the computer 102 of FIG. 1 in one embodiment.

In an embodiment of the present disclosure, the system 202 comprises an application installed on the computer 102 and is accessed by a user associated with the EUD 106.

In an embodiment of the present disclosure, the system 202 may include suitable logic, circuitry, interfaces, and/or code that may be configured to calculate a graph function.

Examples of the system 202 may include, but are not limited to, a computing device, a virtual computing device, a mainframe machine, a server, a computer workstation, a smartphone, a cellular phone, a mobile phone, a gaming device, a consumer electronic (CE) device and/or any other device with trace calculation capabilities.

The EUD 106 may include suitable logic, circuitry, interfaces, and/or code that may provide an adjacency matrix, as a user input, to the system 202. In another embodiment, the EUD 106 may be configured to output the calculated graph function of the adjacency matrix on the display screen 204. Specifically, the system 202 may control the display screen 204 of the EUD 106 to display the calculated graph function of the adjacency matrix on the display screen 204. The EUD 106 may be associated with the user 208 who might wish to calculate the graph function to generate a solution of a graph analysis problem. Examples of the EUD 106 may include, but are not limited to, a computing device, a mainframe machine, a server, a computer workstation, a smartphone, a cellular phone, a mobile phone, a gaming device, a consumer electronic (CE) device and/or any other device with graph function calculation capabilities.

The display screen 204 may comprise suitable logic, circuitry, and interfaces that may be configured to display the graph function of the graph analysis problem. In an embodiment, the display screen 204 may further display one or more user interface elements from which the user 208 may be able to provide the user inputs. In some embodiments, the display screen 204 may be an external display device associated with the EUD 106. The display screen 204 may be a touch screen which may enable the user to provide the user input via the display screen 204. The touch screen may be at least one of a resistive touch screen, a capacitive touch screen, or a thermal touch screen. The display screen 204 may be realized through several known technologies such as, but are not limited to, at least one of a Liquid Crystal Display (LCD) display, a Light Emitting Diode (LED) display, a plasma display, or an Organic LED (OLED) display technology, or other display devices. In accordance with an embodiment, the display screen 204 may refer to a display screen of a head mounted device (HMD), a smart-glass device, a see-through display, a projection-based display, an electro-chromic display, or a transparent display.

The server 206 may include suitable logic, circuitry, and interfaces, and/or code that may be configured to store data. The server 206 may be further configured to store a result of the generation of association between a physical environment and a digital environment, in the form of association data. The server 206 may be implemented as a cloud server and may execute operations through web applications, cloud applications, HTTP requests, repository operations, file transfer, and the like. Other example implementations of the server 206 may include, but are not limited to, a database server, a file server, a web server, a media server, an application server, a mainframe server, or a cloud computing server.

In at least one embodiment, the server 206 may be implemented as a plurality of distributed cloud-based resources by use of several technologies that are well known to those ordinarily skilled in the art. A person with ordinary skill in the art will understand that the scope of the disclosure may not be limited to the implementation of the server 206 and the system 202 as two separate entities. In certain embodiments, the functionalities of the server 206 can be incorporated in its entirety or at least partially in the system 202 or vice-versa, without a departure from the scope of the disclosure.

Figure 3A:
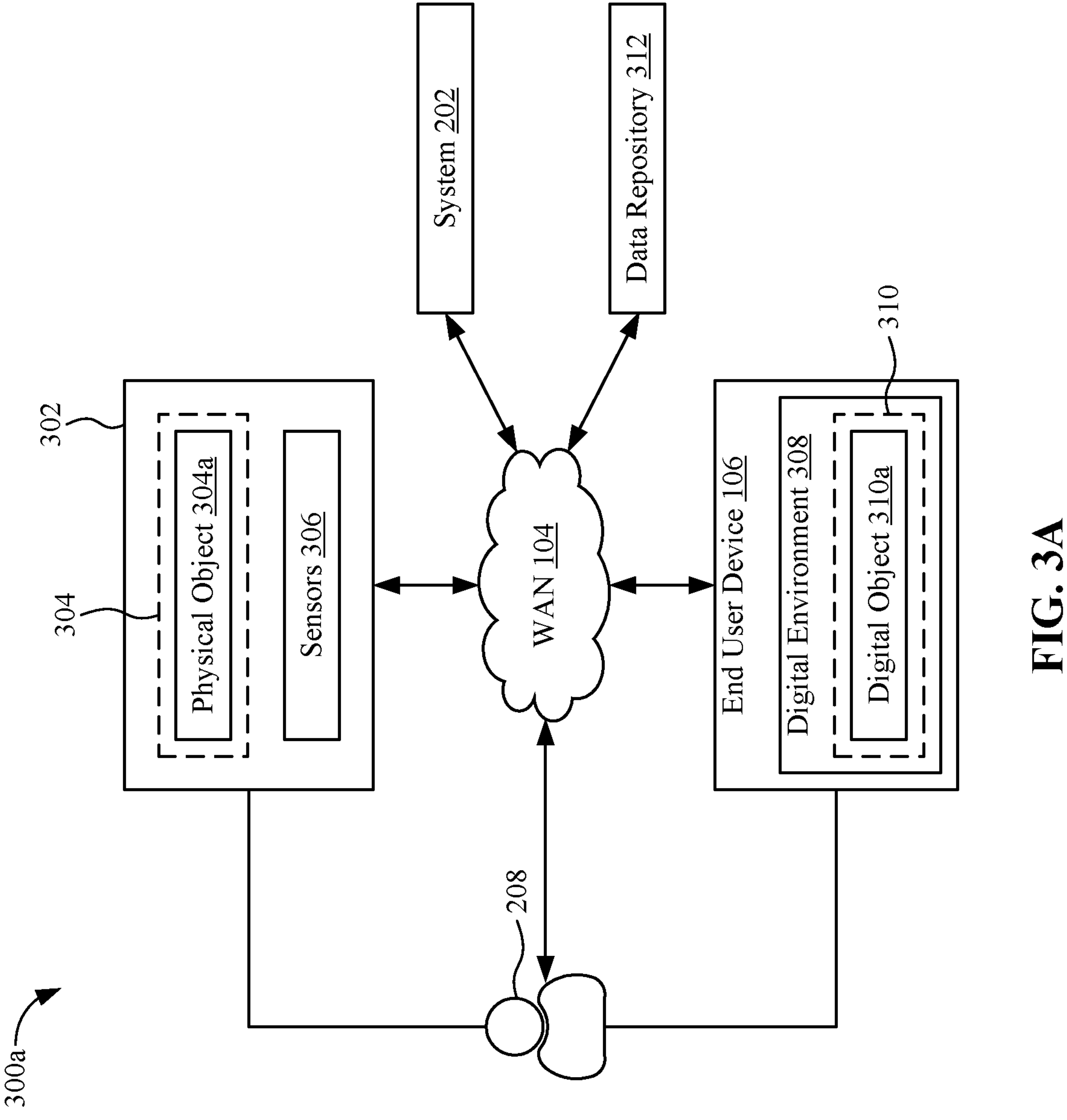
FIG. 3A is a block diagram that illustrates an architecture for implementation of the system, in accordance with an embodiment of the present disclosure.

FIG. 3A is a block diagram that illustrates an architecture 300*a* for implementation of the system 202, in accordance with one or more embodiments of the present disclosure. FIG. 3A is explained in conjunction with elements of FIG. 1 and FIG. 2. FIG. 3A includes the user 208 in a mixed reality environment which comprises a physical environment 302 and a digital environment 308. The user 208 is communicatively coupled to the physical environment 302 and the digital environment 308 either directly or through the WAN 104. The architecture 300*a* also includes the system 202 which includes a processor and a memory to store computer-executable instructions that are executed by the processor to carry out one or operations of the system 202. The architecture 300*a* also includes a data repository 312 for storing data related to the operation of generation of association between the physical environment 302 and the digital environment 308. In one or more embodiments of the present disclosure, the data repository comprises a database, which may be any of a relational database, a graph database, a graph neural network (GNN), a tuple data store, and the like.

In one or more embodiments of the present disclosure, the physical environment 302 corresponds to an in-person experience of the user 208, such as an educational experience, a shopping experience, a sporting experience, a medical experience, and the like.

In one or more embodiments of the present disclosure, the physical environment 302 is experienced by the user in real-time.

In one or more embodiments of the present disclosure, the physical environment 302 is learned by the system 202, which may be done either in real-time, near real-time, or historically.

In one or more embodiments of the present disclosure, data associated with the physical environment 302 is captured by one or more sensors 306. For example, the one or more sensors 306 include a camera that captures one or more images of the physical environment 302 and transmits these images to the system 202 or to the data repository 312. In one or more embodiments of the present disclosure, the one or more images capture data associated with different scenes of the physical environment 302. Each scene may further include one or more physical objects in the scene. For example, a first scene 304 is a physical scene which includes a physical object 304*a*. In one or more embodiments of the present disclosure, the physical object 304*a* is a visible, physical article.

In one or more embodiments of the present disclosure, the physical object 304*a* includes physical articles such as: chairs, floors, walls, television sets, computers, computer screens, persons, vehicles, plants, animals, telephones, wires, papers, and the like. In one or more embodiments of the present disclosure, the physical object 304*a* may also include movable and non-movable images on a television or computer screen, where the "images" can include representations of physical objects, such as those mentioned above as "physical articles." For example, if a user is looking at a television screen depicting a forest, the visual representation of the individual trees in the forest can collectively be considered as the physical object 304*a*, even though the individual trees are not physically a part of the user's immediate observable environment. In yet other embodiments of the present disclosure, the physical object 304*a* includes physical articles that do not emanate sound, such as an iron or a painting.

In one or more embodiments of the present disclosure, the user 208 is also associated with the digital environment 308 which may be experienced by the user 208 through the use of the EUD 106. The EUD 106 may be a mixed reality device, such an AR headset, a VR headset, AR glasses, VR glasses, AR/VR head mounted displays, AR/VR display screens, and the like. In one or more embodiments of the present disclosure, the EUD 106 provides digital rendering for the user's 208 physical environment 302 and this digital rendering forms the digital environment 308.

In one or more embodiments of the present disclosure, the digital environment 308 is experienced by the user in real-time.

In one or more embodiments of the present disclosure, the digital environment 308 is learned by the system 202, which may be done either in real-time, near real-time, or historically.

In one or more embodiments of the present disclosure, the digital environment 308 is associated with different scenes. Each scene may further include one or more virtual or digital objects in the scene. For example, a second scene 310 is a digital scene which includes a digital object 310*a*. In one or more embodiments of the present disclosure, the digital object 310*a* is a digital representation of a physical article that is recorded on a tangible medium of expression. For example, a digital representation of a player running in a match, in the form of a digital avatar of the player forms a digital object corresponding to the physical object that is the player.

In one or more embodiments of the present disclosure, system 202 is configured to generate associations between the physical environment 302 and the digital environment 308 in a completely joint, accurate, and efficient manner. The system 202 is configured to achieve this through implementation of methods and systems depicted in FIG. 3B and FIG. 4 as follows.

Figure 3B:
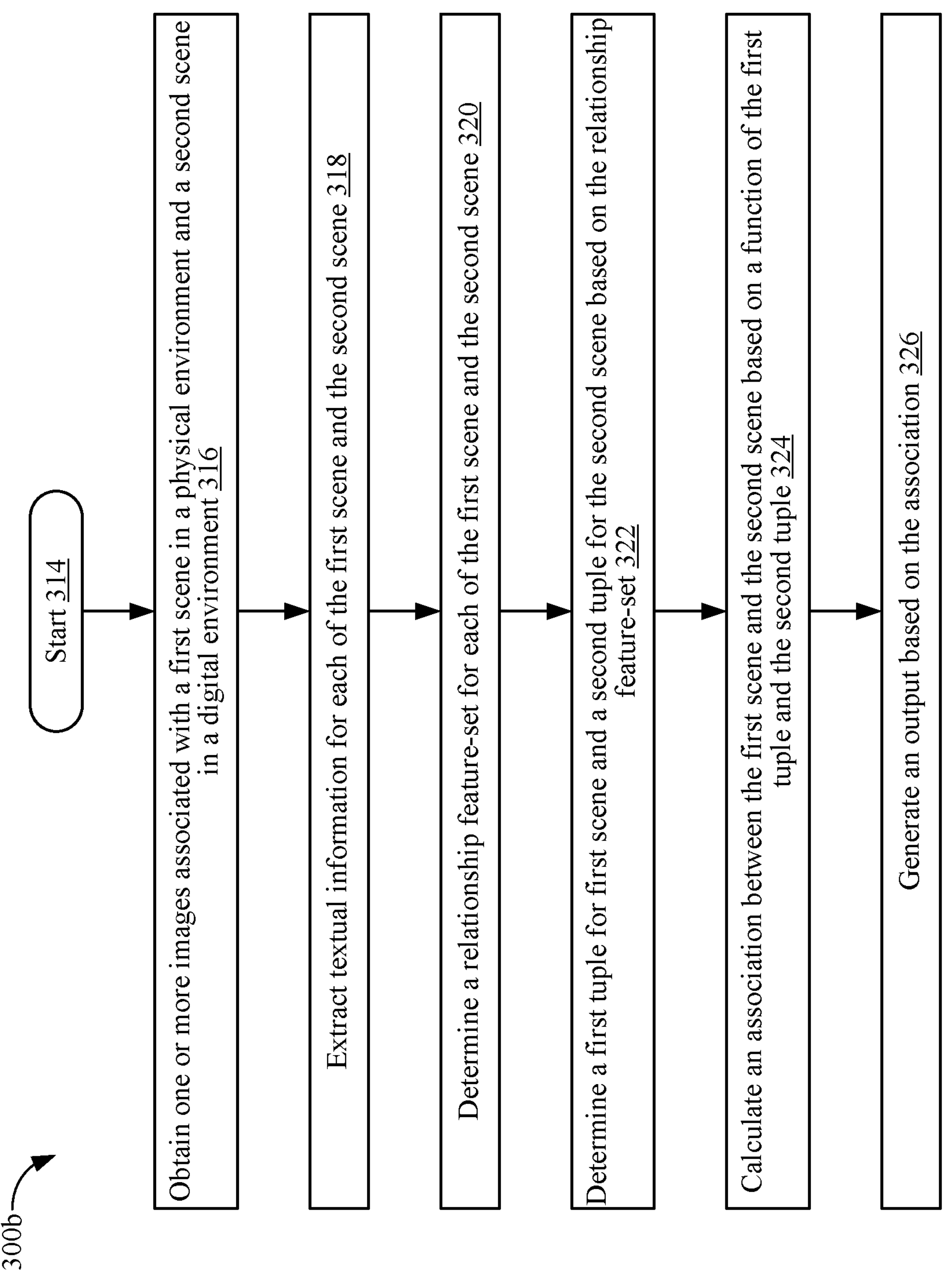
FIG. 3B is a flowchart of a method for generation of an association between a physical environment and a digital environment, in accordance with an embodiment of the present disclosure.

FIG. 3B is a flowchart of a method 300*b* for generation of an association between a physical environment and a digital environment, in accordance with an embodiment of the disclosure.

FIG. 3B is explained in conjunction with elements from FIG. 1, FIG. 2, and FIG. 3A. With reference to FIG. 3B, there is shown a flowchart for the method 300*b*. The operations of the method 300*b* may be executed by any computing system, for example, by the computer 102 of FIG. 1 or the system 202 of FIG. 2 and FIG. 3A. The operations of the method 300*b* may start at 314.

At 316, one or more images associated a first scene in a physical environment and a second scene in a digital environment are obtained. The one or images may be obtained through the use of an image capturing device, a camera, an image sensor, a video recorder, and the like. The physical environment may correspond to a real-world or in-person environment of a user, such as the physical environment 302 of the user 208 depicted in FIG. 3A. The digital environment may correspond to a digital or virtual environment of a user, such as the digital environment 308 of the user 208 depicted in FIG. 3A. The one or more images capture data of the first scene 304 and the second scene 310 through the image capturing device, and the data may be stores in the data repository 312 associated with the system 202.

At 318, textual information associated with each of the first scene 304 and the second scene 310 is extracted. In one or more embodiments of the present disclosure, the textual information comprises sentences describing their corresponding scenes. The sentences may be generated with the help of feature extractors and sentence parsers. The feature extractors may be processing modules, such as CNNs, that take the one or more images as input and extract their features through the use of different layers of a processing framework. These extracted features are then given as input to language parsers for forming sentences corresponding to the extracted features. In one or more embodiments of the present disclosure, this is done in parallel for the first scene and the second scene.

At 320, a relationship feature-set is extracted for each of the first scene and the second scene. The relationship feature-set comprises a subject, a predicate and an object, for each of the first scene and the second scene. For example, for the first scene 304, the subject is the physical object 304*a*, which may be an object-of-interest for the user 208. The predicate describes an action or a state that the subject is associated with and the object is entity that modifies the state of subject or is the entity on which the action is being performed by the subject. In one or more embodiments of the present disclosure, there are a plurality of scenes in the physical environment 302 and a plurality of scenes in the digital environment 308. Each of these plurality of scenes is converted into their relationship feature-sets using feature extractors and language parsers.

At 322, a first tuple for the first scene and a second tuple for the second scene are determined based on their corresponding relationship feature-set. A tuple represents a basic unit of storage or a basic data structure of a data repository, such as for the data repository 312 associated with the system. The format and structure of the tuple is determined by the type of underlying data repository, for example, whether the data repository is a relational database, a graph database, and the like. In one or more embodiments of the present disclosure, if there are plurality of scenes in the physical environment 302 and the digital environment 308, then two buckets or categories of tuples are generated. One bucket corresponds to the tuples of the physical environment 302 and the other bucket corresponds to the tuples of the digital environment 308. In one or more embodiments of the present disclosure, these different buckets are stored as different partitions in the data repository 312.

At 324, an association is calculated between the first scene and the second scene based on a function of the first tuple and the second tuple. In one or more embodiments of the present disclosure, the first tuple and the second tuple are used to generate a graph network. The graph network stores data in the form of a graph database. In one or more embodiments of the present disclosure, for the graph network, the association between the first scene and the second scene is calculated based on the function comprising an adjacency value associated with the first tuple and the second tuple in the graph network. The adjacency value may be calculated by generating a first adjacency graph for the first tuple or a plurality of tuples of the physical environment 302, and a second adjacency graph for the second tuple or a plurality of tuples of the digital environment 308. Each of the adjacency graphs may have their corresponding adjacency values. These adjacency values may be compared with each other to determine a function for these adjacency values, the function is then further used to calculate the association between the plurality of tuples of the physical environment 302 and the plurality of tuples of the digital environment 308.

In one or more embodiments of the present disclosure, the function associated with the first tuple and the second tuple comprises a set of ordered triples. In one or more embodiments of the present disclosure, each triple of the set of ordered triples is of a form (o1, o2, w), where o1 is a physical object of the physical environment, o2 is a virtual object of the digital environment, and w is a weight parameter. For example, o1 is the physical object 304*a* of the physical environment 302 and o2 is the digital object 310*a* of the digital environment 308. In one or more embodiments of the present disclosure, each triple of the form (o1, o2, w) indicates that a relationship R exists from the physical object o1 to the virtual object o2 with a weight corresponding to the weight parameter w. If the weight parameter has a value higher than a threshold value, the relationship R is considered to be strong, indicating a strong association between the physical environment 302 and the digital environment 308. However, if the weight parameter has a value lower than the threshold value, the relationship R is considered to be weak, indicating a weak association between the physical environment 302 and the digital environment 308.

In one or more embodiments of the present disclosure, the weak association determination may lead to the method 300*b* returning back to the extraction of features and textual information for the first scene and the second scene at 318, so that the physical environment 302 and the digital environment 308 can be relearned.

At 326, an output is generated based on the determination of the association between the physical environment and the digital environment. For example, based on the determination of the association between the first scene 304 and the second scene 310, the type of association-weak or strong, between the physical environment 302 and the digital environment 308 is determined and used to generate the output.

In one or more embodiments of the present disclosure, the output is generated as overlay data on a display interface associated with the digital environment. For example, the overlay data comprises a natural language text displayed on the display interface or the display screen 204 of the EUD 106.

In one or more embodiments of the present disclosure, the output is generated as a binaural sound. The binaural sound helps in mitigating the inverse base-rate effect and provides for strong associations reinforcing between the physical environment and the digital environment. Further details related to the method 300*b* are described in conjunction with FIG. 4 below.

Figure 4:
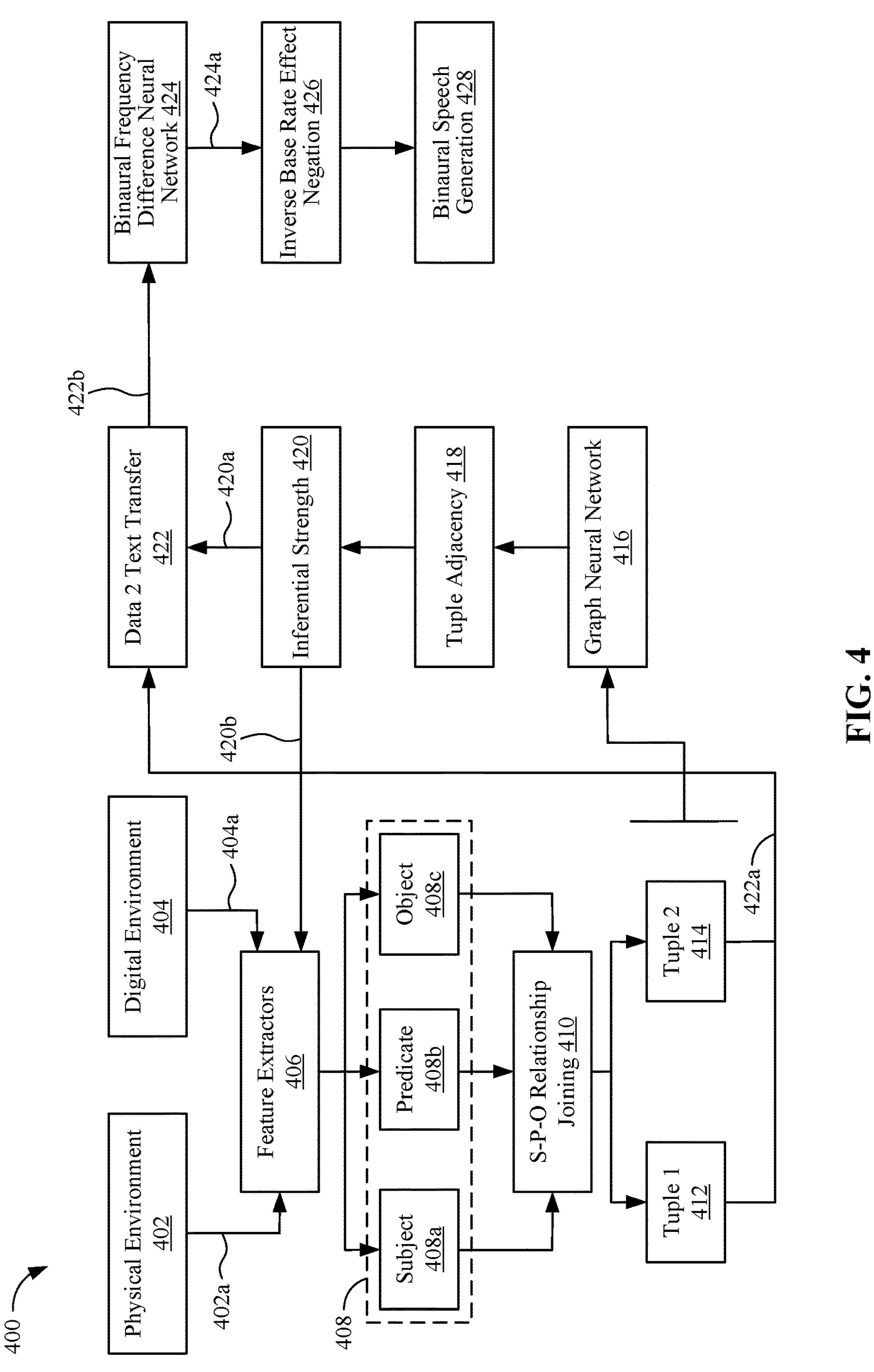
FIG. 4 is a block diagram of a process for relationship activation between a physical environment and a digital environment, in accordance with an embodiment of the present disclosure.

FIG. 4 is a block diagram of a process 400 performed by the system 202 for relationship activation between a physical environment and a digital environment, in accordance with an embodiment of the present disclosure.

The system 202 receives data from an in-person experience environment, also referred to as a physical environment 402 of a user (not shown), and from an augmented experience environment also referred to as a digital environment 404. The physical environment 402 and the digital environment 404 are equivalent to the physical environment 302 and the digital environment 308, respectively.

The data from the physical environment 402 and the digital environment 404 is received in the form of images. For example, the physical environment 402 corresponds to a first scene 402*a* or a place where the user is located at a particular time instant. The data about the first scene 402*a* is captured in the form of one or more images such as by using a camera or any other equivalent image sensing device. This data may then be sent to a computer, such as the system 202, that may store these one or more images and retrieve them later for processing.

In one or more embodiments of the present disclosure, the digital environment 404 corresponds to an augmented reality environment in which the user is associated with a second scene 404*a*. For example, the second scene 404*a* may be an augmented rendering of the first scene 402*a* in the digital space, which is enabled by use of an augmented reality device, such as an AR headset. For the second scene 404*a* in the digital environment 404 also, one or more images are obtained by the system 202.

In one or more embodiments of the present disclosure, the data associated with the one or more images corresponding to the first scene 402*a* and the second scene 404*a* is stored in the system 202. The system 202 also includes feature extractors 406 which are used to extract textual information for each of the first scene 402*a* and the second scene 404*a*.

In one or more embodiments of the present disclosure, the feature extractors 406 are neural models or a computer vision model which is executed to extract a language representation from an input scene. The input scene may be the first scene or second scene. For example, the feature extractors are a combination of a convolutional neural network (CNN), a feature pyramidal extraction model, a large video model and the like.

In one or more embodiments of the present disclosure, the convolutional neural network (ConvNets or CNNs) are utilized for classification and computer vision tasks. They have three main types of layers, which are—a convolutional layer, a pooling layer, and a Fully-connected (FC) layer. The convolutional layer is the first layer of a convolutional network. While convolutional layers can be followed by additional convolutional layers or pooling layers, the fully connected layer is the final layer. With each layer, the CNN increases in its complexity, identifying greater portions of an input image. Earlier layers focus on features that are lesser in complexity, such as colors and edges. As the input image data progresses through the layers of the CNN, it starts to recognize larger elements or shapes of the object until it finally identifies the intended object.

In one or more embodiments of the present disclosure, the feature pyramidal extraction model is used to extract features of a single-scale input image. The extracted features are used to create a multi-scale feature pyramid from the single-scale input image. This approach is particularly effective for detecting objects at different scales (sizes) within an image, which is a common challenge in object detection tasks. In one or more embodiments, the feature pyramidal extraction model comprises a bottom-up pathway layer, a top-down pathway layer, and an output layer.

In one or more embodiments of the present disclosure, in the bottom-up pathway layer, the input image is processed through a series of convolutional layers to produce feature maps at multiple levels of the network, each with decreasing spatial dimensions but increasing semantic information.

In one or more embodiments of the present disclosure, in the top-down pathway layer, higher-level features of the input image, with strong semantic information but low spatial resolution are upsampled (increased in size) and enhanced with spatial information from the corresponding-level feature maps in the bottom-up pathway through lateral connections. This process is repeated at multiple levels, creating a pyramid of feature maps that are rich both semantically and spatially.

In one or more embodiments of the present disclosure, in the output layer a collection of feature maps of different scales but with a consistent level of semantic strength are obtained. These collection of feature maps can then be used by a detection head (like Region Proposal Networks, RPNs, or other classifiers) to detect objects at different scales more effectively.

In one or more embodiments of the present disclosure, a large video model comprises a machine learning model based on use of deep learning techniques to process large amounts of data, including images, text, and other forms of information. This enables the large video models to recognize patterns, make predictions, and generate high-quality outputs. In one or more embodiments of the present disclosure, the large video model is configured to manage the complexity of both spatial information (like images) and temporal information (how the scene changes over time).

In one or more embodiments of the present disclosure, using one or a combination of the computer vision models described above, the feature extractors 406 are used to extract features from the one or more input images of the first scene 402*a* and the second scene 404*a*. These features are then used to extract textual information 408 for each of the first scene 402*a* and the second scene 404*a*. The textual information 408 comprises language information for each of the scenes. In one or more embodiments of the present disclosure, the language information comprises sentences describing the scene. For example if the first scene corresponds to a stadium where a football match is being played and a player hits a goal, the textual information 408 may comprise a sentence such as "A goal has been secured by player 1". Similarly different images corresponding to different scenes, from the physical environment 402 as well as the digital environment 404 are transformed into corresponding sentences using the textual information 408 extracted using the feature extractors 406.

In one or more embodiments of the present disclosure, for each of the sentences describing each of the scenes, one or more labels are identified. The labels describe a relationship feature-set 410 that describes the textual information 408 for the corresponding scene. For example for each of the first scene 402*a* and the second scene 404*a*, the relationship feature-set 410 includes labels such as a subject 408*a*, an object 408*c*, and a predicate 408*b* that when joined together form the sentences. As is known from language and grammar rules, any sentence can be divided into three main parts, these are the subject, the object, and the predicate. The subject describes the main actor in the sentence and is the actor who or what the sentence is about. The subject is usually a noun or a pronoun. The predicate tells what the subject is or what the subject does. The predicate is generally a verb and describes an action or state of being of the subject. The object is the entity that is acted upon by the subject. For example, for the previously described sentence, "A goal has been secured by player 1", "goal" is the subject, "has been secured" is the predicate, and "player 1" is the object. Similarly for each scene, the relationship feature-set 410 comprising the subject 408*a*, the object 408*c* and the predicate 408*b* which completely describe the scene are extracted using the feature extractors 406.

In one or more embodiments of the present disclosure, the relationship feature-set 410 is extracted using language parsers.

In one or more embodiments of the present disclosure, the relationship feature-set 410 is used to determine tuples corresponding to the scenes. For example, based on the relationship feature-set 410, a first tuple 412 is identified for the first scene 402*a* and a second tuple 414 is identified for the second scene 404*a*. A tuple is a computer understandable representation of relationships between entities. The entities in the one or more embodiments of the present disclosure are the labels of the subject 408*a*, the object 408*c* and the predicate 408*b* in the relationship feature-set 410. For example, for the previously described sentence, "A goal has been secured by player 1", a tuple may be represented and stored in the system as, {"goal"|"secured"|"player 1"}. The tuples may be represented and stored in different formats based on the type of a data store. The data stores may be of any of one or more relational databases, NoSQL databases, in-memory data structures, graph data structures and the like.

In one or more embodiments of the present disclosure, the tuples, such as the first tuple 412 and the second tuple 414 are used to calculate an association between the first scene 402*a* and the second scene 404*a*, so that an output corresponding to the association may be generated.

In one or more embodiments of the present disclosure, the first tuple 412 and the second tuple 414 are stored in a graph database.

In one or more embodiments of the present disclosure, the first tuple 412 and the second tuple 414 are used to generate a graph network 416. The graph network 416 represents a data structure which is a collection of nodes and edges. An edge is a link that connects pairs of nodes. Graph networks are used to represent various kinds of relationships and structures, such as social networks, transportation networks, biological networks, and the like. The graph network 416 may store the tuples (such as the first tuple 412 and the second tuple 414) in a manner that captures relationships between entities or labels of the tuples in an efficient manner.

In one or more embodiments of the present disclosure, the tuples are stored as nodes of the graph network 416 and relationships between the tuples are stored as edges of the graph network 416. In one or more embodiments of the present disclosure, the graph network 416 is a graph neural network (GNN) which is a type of neural network designed to process data that is represented as a graph. GNNs operate by aggregating information from a node's neighbors (other nodes it is directly connected to by edges). This aggregation process typically involves learning functions that are used to combine the features of neighboring nodes and edges, potentially weighted by the characteristics of the connections. Through successive layers of aggregation, GNNs learn to generate embeddings (dense vector representations) for each node and possibly for each edge. These embeddings capture the features of the nodes and edges and also the structure of their local graph neighborhoods. In each layer of the GNN, nodes send messages to their neighbors. These messages are functions of the node's current state (its features) and possibly the features of the connecting edge. Each node then aggregates the messages it receives from its neighbors, using operations like summing, averaging, or taking the maximum. This aggregated information is combined with the node's own features to update its state, resulting in new node embeddings that capture both its features and its connectivity. Finally, the embeddings can be used for tasks such as classification, prediction, or clustering.

In one or more embodiments of the present disclosure, the graph network 416 is stored in memory or persistent storage using various data structures, including adjacency lists, adjacency matrices, edge lists, or specialized graph databases like Neo4j, which are optimized for storing and querying complex relationships.

In one or more embodiments of the present disclosure, the system 202 is configured to use the stored graph network and calculate the association between the tuples stored as the nodes of the graph network 416. In graph theory and applications, several functions and algorithms are used to analyze and determine associations between tuples (nodes) of the graph using different functions. One such function is based on adjacency parameter of a graph. "Adjacency" refers to the direct connection between pairs of nodes (or vertices) through edges (or links). When two nodes are adjacent, there is an edge that directly connects them, indicating some form of relationship or interaction between these nodes. The concept of adjacency is fundamental in graph theory and is used to describe and analyze the structure of networks. Adjacency can be represented in different ways such as an adjacency matrix, an adjacency list, an edge list and the like. The adjacency matrix may be a square matrix that may represent the connections or relationships between nodes (or vertices) in a graph. Each entry in the adjacency matrix may correspond to a potential edge between two nodes, and its value indicates whether there is a connection between those nodes or not. Typically, in the graph, the adjacency matrix may be symmetric, with a "1" in the entry (i, j) if nodes i and j are connected and a "0" if they are not. Hence, the adjacency matrix may provide a structured way to encode the graph's connectivity and may be a fundamental tool for performing one or more graph-related computations and algorithms, making it essential in various graph analysis problems, from social network analysis to transportation route optimization and beyond.

In one or more embodiments of the present disclosure, for the graph network 416, an adjacency value associated with the first tuple 412 and the second tuple 414 is determined to calculate the function describing the association between the first scene 402*a* and the second scene 404*a*. The adjacency value thus corresponds to a tuple adjacency 418 value for the first tuple 412 and the second tuple 414 of the graph network 416.

In one or more embodiments of the present disclosure, the tuple adjacency 418 is determined for different tuples corresponding to different scenes of the physical environment 402.

In one or more embodiments of the present disclosure, the tuple adjacency 418 is determined for different tuples corresponding to different scenes of the physical environment 402.

In one or more embodiments of the present disclosure, the tuple adjacency 418 is represented in the form of an adjacency graph. For example, if there are 100 scenes corresponding to the physical environment 402 and 100 scenes corresponding to the digital environment 404, then there is a first adjacency graph for the 100 scenes from the physical environment 402 which represents adjacency or association between these 100 scenes. Similarly, there is a second adjacency graph for the 100 scenes from the digital environment 404 which represents adjacency or association between these 100 scenes of the digital environment 404. This helps to establish relative relevance and importance of different scenes from each of the physical environment 402 and the digital environment 404. For example, the scenes with high adjacency value are more relevant and accurate for the user experiencing those scenes. Also, the scenes with high adjacency value are considered to be causal and so the adjacency graphs for these scenes are considered as causal graphs. Causal graphs are graphical representations that illustrate causal relationships between variables within a system. They are used in statistics, machine learning, epidemiology, and social sciences to model and understand the cause-and-effect dynamics that underpin observed phenomena. By visually depicting how different variables influence one another, causal graphs help in making predictions, infer causality, and design interventions in different systems.

In one or more embodiments of the present disclosure, the adjacency graphs are represented in different colours such as red, blue, green, etc, to represent different adjacency values.

In one or more embodiments of the present disclosure, the tuple adjacency 418 values, such as in the form of adjacency graphs of different tuples from the scenes in the physical environment 402 and the digital environment 404 are then linked to established relationships between the scenes from the physical environment 402 and the scenes from the digital environment 404. The linking of the scenes from the physical environment 402 and the scenes from the digital environment 404 is done by calculating an inferential strength 420 value for the linkage or association between the scenes from the physical environment 402 and the scenes from the digital environment 404.

In one or more embodiments of the present disclosure, the inferential strength 420 value includes a value of a function associated with the first tuple 412 and the second tuple 414.

In one or more embodiments of the present disclosure, the inferential strength 420 value includes a value of a function associated with a first adjacency graph of a first set of tuples of the physical environment 402 and a second adjacency graph of a second set of tuples of the digital environment 404.

In one or more embodiments of the present disclosure, the function comprises a set of ordered triples. Each triple of the set of ordered triples is of a form (o1, o2, w), where o1 is a physical object of the physical environment 402, o2 is a virtual object of the digital environment 404, and w is a weight parameter. The triple of the form (o1, o2, w) indicates that a relationship R exists from the physical object o1 to the virtual object o2 with a weight corresponding to the weight parameter w. Ordered triples can be used to represent relationships in graphs. An ordered triple in the context of a directed graph typically represents an edge between two vertices along with additional information.

In one or more embodiments of the present disclosure, the relationship R indicates the inferential strength 420 of the adjacency graphs of the tuples from the physical environment 402 and the adjacency graphs of the tuples from the digital environment 404.

In one or more embodiments of the present disclosure, the function is used to calculate the inferential strength value for the association between a physical scene and a digital scene, such as the first scene 402*a* and the second scene 404*a*, which is then used to generate an output 420*a*. The output 420*a* may be in any form such as text, natural language, simple audio, binaural sound, and the like.

In one or more embodiments of the present disclosure, a CNN may be used to extract the inferential strength 420. The inferential strength 420 is an indicator of associations between the physical environment 402 and the digital environment 404 and the cause of such association. In one or more embodiments of the present disclosure, based on the inferential strength 420, one or more features may be re-extracted 420*b* by the feature extractors 406.

In one or more embodiments of the present disclosure, based on the inferential strength 420 the output 420*a* is rendered as overlay data on a display interface associated with the digital environment 404. For example, the digital environment 404 corresponds to the EUD 106, which may be an AR headset comprising the display interface.

In one or more embodiments of the present disclosure, the output 420*a* of the high inference adjacency graphs, along with their corresponding tuples 422*a* is passed to a data to text transfer 422 module. In one or more embodiments of the present disclosure, the data to text transfer 422 module may be a transformer.

In one or more embodiments of the present disclosure, the EUD 106 may include a processor for performing data to text transfer 422 in order to convert the output 420*a* in the form of text. The text may include a natural language text output 422*b* which is rendered in the form of a sentence on the display interface as overlay data. The overlay data comprises additional data that is rendered on the display interface of the EUD 106 along with rendering of a primary output. In one or more embodiments of the present disclosure, the primary output may be a video of a digital scene corresponding to the physical environment 402.

In one or more embodiments of the present disclosure, the output 420*a* is converted in a manner to be rendered as a sound, such as a binaural sound 424*a* produced by a binaural frequency neural network 424.

In one or more embodiments of the present disclosure, natural language text output 422*b* is processed by the binaural frequency neural network 424 to produce the binaural sound 424*a*. The binaural sound 424*a* is a method of recording and reproducing audio that aims to create a three-dimensional auditory experience for the listener. It works by simulating the natural hearing process of human ears, which are spaced apart and receive sound from slightly different angles and distances. By presenting different sounds to each ear, the binaural sound 424*a* attempts to replicate the cues that human brains use to perceive direction, distance, and spatial location of sound sources. A binaural system may include a headset or another two-speaker system but may also include systems with more than two speakers directed to the ears of a user. The sounds may be presented as 3D audio, where each sound has a perceived position in space, achieved by using reverberation and head-related transfer functions to mimic how sounds change as they move in a particular space.

In one or more embodiments of the present disclosure, the binaural sound 424*a* is used to for inverse base rate effect navigation 426 to dampen the effects of inverse base rate in attention theory. As a result, binaural speech 428 is generated that leads to effective direction of attention of the user to the most relevant event for them, and this producing very effective association between the physical environment 402 and the digital environment 404. In one or more embodiments of the present disclosure, the digital environment 404 is rendered by the EUD 106. The EUD 106 may comprise a mixed-reality rendering device such as an AR headset, AR glasses, VR headsets, and the like.

Figure 5:
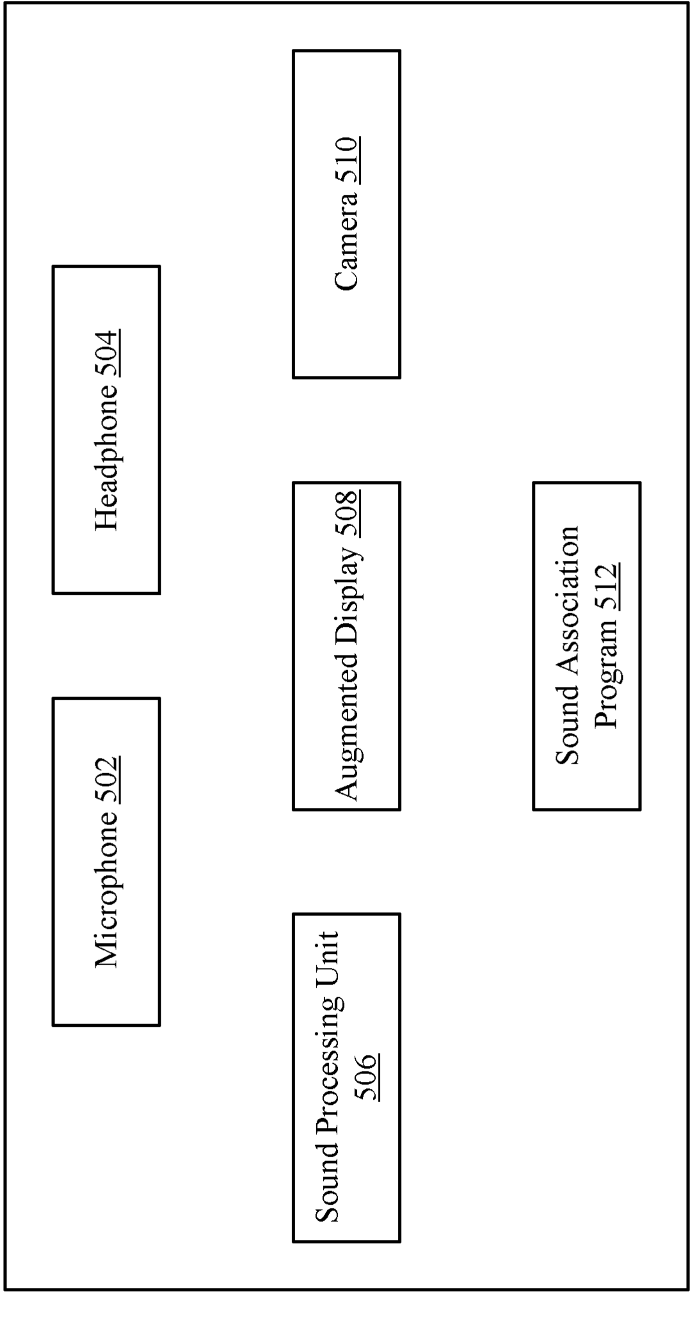
FIG. 5 is a block diagram that illustrates an end user device as an extended reality device, in accordance with an embodiment of the present disclosure.

FIG. 5 is a block diagram that illustrates of an extended reality device 500, such as the EUD 106 as an, according to an embodiment of the present disclosure. The extended reality device 500 may be any of the AR headset, the AR glasses, VR headsets, and the like mentioned above.

In one or more embodiments of the present disclosure, the extended reality device 500 comprises a microphone 502, a sound processing unit 506, a headphone 504, an augmented display 508, a camera 510, and a sound association program 512.

In one or more embodiments of the present disclosure, the microphone 502 is a device that is designed to receive sounds detected from a user's immediate environment. In one or more embodiments of the present disclosure, the microphone 502 can be a directional microphone, which can detect and receive sounds coming from various directions with respect to the position of the microphone 502. In other embodiments of the present disclosure, the microphone 502 can be a non-directional microphone, which detects and collects sounds from a specific direction based on the orientation of the microphone 502. In some embodiments of the present disclosure, the microphone 502 may include filtering features to detect sounds of particular frequency ranges, or volume levels.

In one or more embodiments of the present disclosure, the sound processing unit 506 is a sound modification system that alters the characteristic of an input sound. In one or more embodiments of the present disclosure, the sound processing unit 506 includes a processor that can perform at least the following functions: increasing the decibel value of an input sound, reducing the decibel value of an input sound, maintaining the decibel value of an input sound, cancelling an input sound, or replacing an input sound with an alternate sound. In some embodiments, the sound processing unit 506 replaces an input sound with a non-natural sound stored in the persistent storage 120.

In one or more embodiments of the present disclosure, the headphone 504 is a sound delivery device that is attachable to at least one ear of the user, such that the user hears the delivered sound. In some embodiments, the headphone 504 includes an earphone that directly transmits an audio signal to an ear of a user. For example, the headphone 504 can be a wearable audio delivery device containing at least one ear cup or ear insert, and the ear cup or ear insert can deliver sound to the user. In some embodiments, the headphone 504 can deliver either naturally occurring sounds from the user's immediate environment, reproduced sounds, or digitally generated sounds, to the user. For example, if a user observes a moving object that emanates sound, such as a character in a movie, the emanated sound can be delivered to the user via the headphone 504.

In one or more embodiments of the present disclosure, the augmented display 508 is a type of visual display that is capable of displaying the images or video captured by the camera 510. In some embodiments of the present disclosure, the augmented display 508 can be attached to the extended reality device 500, such that the augmented display 508 can produce a display of a realistic representation of a user's surrounding environment, replacing the real-world view. In other embodiments, a user can view real-world images and receive augmentation on top of or overlaid on the real-world images, by use of the augmented display 508.

In one or more embodiments of the present disclosure, the camera 510 is an image capturing device for recording visual images in the form of a photograph or video signals. In some embodiments of the present disclosure, the camera 510 may be one or a combination of camera types that includes a (an): action camera, animation camera, autofocus camera, backup camera, body camera, box camera, camera phone, closed-circuit television camera, canon camera, digital camera, field camera, helmet camera, light-field camera, multiplane camera, or any other type of camera that is now known or later created. In one or more embodiments of the present disclosure, for example, the camera 510 can be used to capture a live feed, or record and play a visual feed in order to establish the visual environment which the extended reality device 500 will use to augment an interactive user experience.

In one or more embodiments of the present disclosure, the camera 510 can be used to determine a user's response to a given stimulus by associating facial expressions to the relevant emotion. For example, if a user is exposed to a scary character in a horror film, and the user's facial expression changes so as to express fear, the camera 510 is enabled to capture the change in the user's facial expression. Further, for example, the camera 510 can record facial micro-expressions, which can occur as fast as 1/15 to 1/25 of a second. The recording of the user micro-expressions by the camera 510 is used to associate a user response to a given stimulus. In some embodiments, the camera 510 is a collection of image capturing devices communicatively connected to the extended reality device 500. For example, the camera 510 can be a collection of wall-mountable cameras arranged so as to capture a 360-degree view of the user's immediate observable environment. In some embodiments, the camera 510 is operationally connected to the extended reality device 500 and captures still or moving images of the user's immediate observable environment.

In one or more embodiments of the present disclosure, the sound association program 512, contained in the extended reality device 500, is a program used to deliver or modify an input sound that is transmitted to the user. In some embodiments, the sound association program 512 receives a stimulus as its input, identifies the S/R association from the stimulus, determines whether there is an S/R association pair to provide a desirable modification to a user's response, and ultimately modifies the user response by applying a known S/R association as an input sound transmitted to the user. The input sound transmitted to the user may be binaural sound.

In one or more embodiments of the present disclosure, the extended reality device 500 is a physical device that is worn by a user. In one or more embodiments of the present disclosure, the extended reality device 500 includes a wearable device designed to be removably attached to a user's head. In some embodiments, the extended reality device 500 encompasses the user's eyes and ears. In some embodiments of the present disclosure, the extended reality device 500 is configured to contain a display that is designed to be utilized with the extended reality device 500, such as a pair of glasses that provide information not readily available in the user's environment or a fully encompassing apparatus, such as a pair of goggles or a helmet, that provides information not readily available in the user's environment. For example, the extended reality device 500 includes a headpiece worn by the user that enables the user to interact with his or her immediate environment, providing visual and audio input of the immediate environment, and provide augmentation of visual and/or audio input.

Figure 6A:
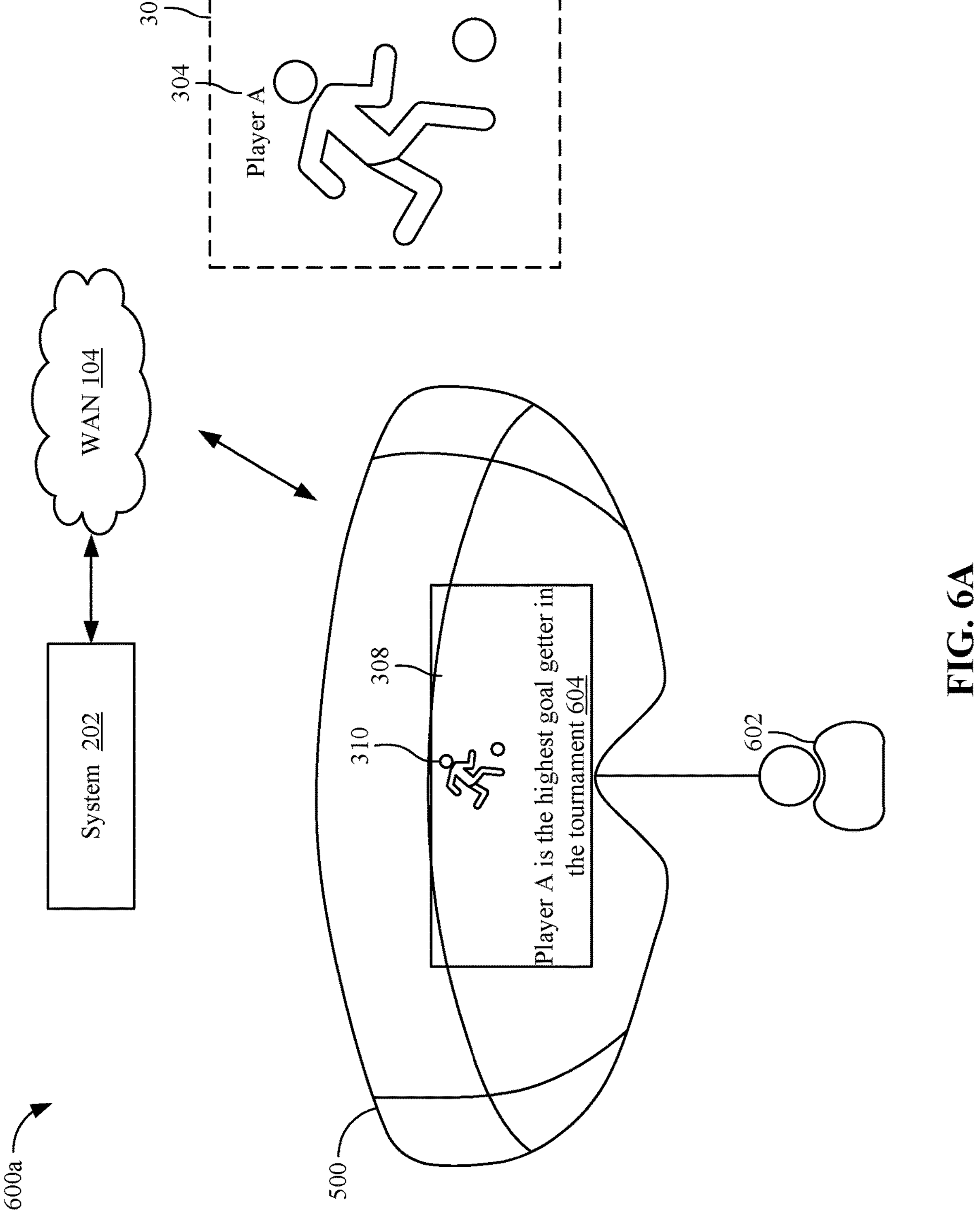
FIG. 6A is diagram that illustrates an application associated with usage of the extended reality device of FIG. 5, in accordance with an embodiment of the present disclosure.

FIG. 6A is a diagram that illustrates an application 600*a* associated with usage of the extended reality device 500, according to one or more embodiments of the present disclosure. FIG. 6A is explained in conjunction with elements from FIG. 1, FIG. 2, FIG. 3, FIG. 4, and FIG. 5 above.

In one or more embodiments of the present disclosure, the application 600*a* associated with the use of the extended reality device 500 includes a user 602 watching a sporting event, such as a match of football in a stadium. Thus, the physical environment 302 of the user 602 corresponds to the stadium where the user 602 may be particularly watching a player A. The player A is thus the physical object 304*a* for the user 602.

In one or more embodiments of the present disclosure, the user 602 is carrying or wearing the extended reality device 500, such as AR glasses. The extended reality device 500 may capture and render on the augmented display 508, the playback of the football match and the player A. Thus, the digital environment 308 includes the playback of the football match on the augmented display 508 and the digital (or virtual) object 310*a* is the rendering of an avatar or visual character corresponding to the player A.

In one or more embodiments of the present disclosure, the extended reality device 500 is in communication with the system 202 through the WAN 104. The system 202 is configured to establish the association between the physical object 304*a* of the physical environment 302 and the digital object 310*a* of the digital environment 308 using the methods described in FIG. 3 and FIG. 4 above. As a consequence of establishing the association, the system 202 generates an output 604 which provides additional information about the player A. The output 604 is rendered in the form of overlay data on a display interface, such as the augmented display 508, associated with the digital environment 308. In one or more embodiments of the present disclosure, as shown in FIG. 6A, the overlay data comprises the output 604 in the form of natural language text, which is a sentence that is displayed over the digital scene rendered for the digital environment 308 on the augmented display 508 of the extended reality device 500.

Figure 6B:
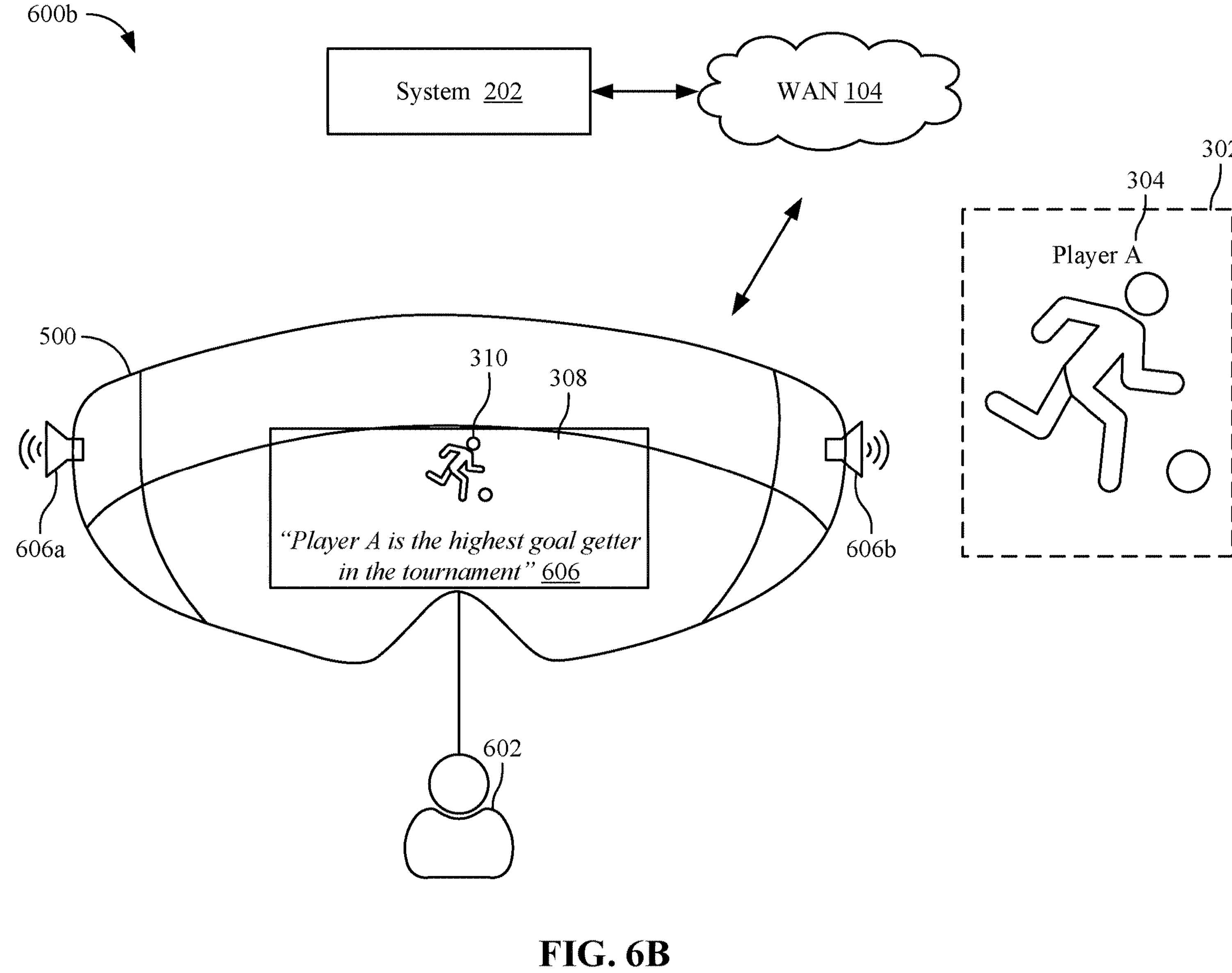
FIG. 6B is a diagram that illustrates an application associated with usage of the extended reality device of FIG. 5, in accordance with an embodiment of the present disclosure.

FIG. 6B is a diagram that illustrates an application 600*b* associated with usage of the extended reality device 500 of FIG. 5, in accordance with an embodiment of the present disclosure. Referring to FIG. 6B, the overlay data is rendered in the form of binaural sound 606, through the use of dual channel speakers, a speaker 606*a* for a left channel and a speaker 606*b* for a right channel.

The use of overlay data in the form of the natural language text output 604 or the binaural sound 606, based on the association between the physical environment 302 and the digital environment 308, as generated by the system 202 is advantageous in negating the effects of inverse base-rate effect. This further leads to improvements in the technical accuracy and efficiency of the produced output in mixed environments, thereby enhancing user experience for the use of extended reality devices in such mixed environments.

More specifically, the formation of associations between digital environments and physical environments based on the methods and systems described herein provide for deepening of inferential strength of the tuples stored in a data repository, which helps in counteracting human attention theory of rare event biasing under variable mixing of digital environments and physical environments. Additionally, the use of relationship feature sets helps in factoring in of causality measures in the different environments—the digital environment and the physical environment. Further use of these relationship feature sets in determining the function of association between the physical environment and the digital environment provides better inferences for rendering on augmented devices, in a more intuitive and user-friendly manner, through the use of natural language sentences and binaural sounds. This further leads to better adoption, comfort and less inertia at user end, for the usage of augmented reality and extended reality devices.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:

obtaining, by a computer, one or more images associated with a first scene in a physical environment and a second scene in a digital environment, wherein the second scene is an augmented rendering, of the first scene, in the digital environment, and the second scene of the digital environment comprises a digital object that is a digital representation of a physical object in the physical environment;

extracting, by the computer, textual information for each of the first scene and the second scene;

determining, by the computer, a relationship feature-set for each of the first scene and the second scene based on the extracted textual information, the relationship feature-set comprising at least: a subject and a predicate for each of the first scene and the second scene, and the physical object for the first scene, and the digital object for the second scene;

determining, by the computer, a first tuple for the first scene and a second tuple for the second scene, based on the relationship feature-set;

calculating an association between the first scene and the second scene based on a function associated with the first tuple and the second tuple, wherein the function corresponds to a weight parameter, and the association is a strong association based on the weight parameter that is greater than a threshold value;

generating an output based on the association; and rendering the generated output as overlay data on a display interface associated with the digital environment.

2. The computer-implemented method of claim 1, further comprising:

generating a graph network based on the first tuple and the second tuple; and calculating the association between the first scene and the second scene based on the function comprising an adjacency value associated with the first tuple and the second tuple in the graph network.

3. The computer-implemented method of claim 1, wherein the function associated with the first tuple and the second tuple comprises a set of ordered triples, wherein each triple of the set of ordered triples is of a form (o1, o2, w), where o1 is the physical object of the physical environment, o2 is the digital object of the digital environment, and w is the weight parameter, and wherein each triple of the set of the ordered triples of the form (o1, 2, w) indicates that a relationship R exists from the physical object o1 to the digital object o2 with a weight corresponding to the weight parameter w.

4. The computer-implemented method of claim 1, further comprising executing a computer vision model for extracting the textual information for each of the first scene and the second scene, wherein the computer vision model is selected from a group consisting of: a convolutional neural network model, a feature pyramidal extraction model, and a large video model.

5. The computer-implemented method of claim 1, wherein the overlay data comprises a natural language text output.

6. The computer-implemented method of claim 1, wherein the overlay data comprises binaural sound.

7. The computer-implemented method of claim 1, wherein the display interface is associated with an extended reality device.

8. The computer-implemented method of claim 1, further comprising storing the first tuple and the second tuple in a graph database.

9. A system, comprising:

a processor set configured to:

obtain one or more images associated with a first scene in a physical environment and a second scene in a digital environment, wherein the second scene is an augmented rendering, of the first scene, in the digital environment, and the second scene of the digital environment comprises a digital object that is a digital representation of a physical object in the physical environment;

extract textual information for each of the first scene and the second scene;

determine a relationship feature-set for each of the first scene and the second scene based on the extracted textual information, the relationship feature-set comprising at least: a subject and a predicate for each of the first scene and the second scene, and the physical object for the first scene, and the digital object for the second scene;

determine a first tuple for the first scene and a second tuple for the second scene, based on the relationship feature-set;

calculate an association between the first scene and the second scene based on a function associated with the first tuple and the second tuple, wherein the function corresponds to a weight parameter, and the association is a strong association based on the weight parameter that is greater than a threshold value;

generate an output based on the association; and render the generated output as overlay data on a display interface associated with the digital environment.

10. The system of claim 9, wherein the processor set is further configured to:

generate a graph network based on the first tuple and the second tuple; and calculate the association between the first scene and the second scene based on the function comprising an adjacency value associated with the first tuple and the second tuple in the graph network.

11. The system of claim 9, wherein the function associated with the first tuple and the second tuple comprises a set of ordered triples, wherein each triple of the set of ordered triples is of a form (o1, o2, w), where o1 is the physical object of the physical environment, o2 is the digital object of the digital environment, and w is the weight parameter, and wherein each triple of the set of the ordered triples of the form (o1, o2, w) indicates that a relationship R exists from the physical object o1 to the digital object o2 with a weight corresponding to the weight parameter w.

12. The system of claim 9, wherein the processor set is further configured to execute a computer vision model to extract the textual information for each of the first scene and the second scene, wherein the computer vision model is selected from a group consisting of: a convolutional neural network model, a feature pyramidal extraction model, and a large video model.

13. The system of claim 9, wherein the overlay data comprises a natural language text output.

14. The system of claim 9, wherein the overlay data comprises binaural sound.

15. The system of claim 9, wherein the display interface is associated with an extended reality device.

16. The system of claim 9, wherein the processor set is further configured to store the first tuple and the second tuple in a graph database.

17. A computer program product for generating associations between a physical environment and a digital environment, the computer program product comprising a computer readable storage medium having program instructions embodied therewith, the program instructions executable by a computer to configure the computer for:

obtaining, by the computer, one or more images associated with a first scene in the physical environment and a second scene in the digital environment, wherein the second scene is an augmented rendering, of the first scene, in the digital environment, and the second scene of the digital environment comprises a digital object that is a digital representation of a physical object in the physical environment;

extracting, by the computer, textual information for each of the first scene and the second scene;

determining, by the computer, a relationship feature-set for each of the first scene and the second scene based on the extracted textual information, the relationship feature-set comprising at least: a subject and a predicate for each of the first scene and the second scene, and the physical object for the first scene, and the digital object for the second scene;

determining, by the computer, a first tuple for the first scene and a second tuple for the second scene, based on the relationship feature-set;

calculating, by the computer, an association between the first scene and the second scene based on a function associated with the first tuple and the second tuple, wherein the function corresponds to a weight parameter, and the association is a strong association based on the weight parameter that is greater than a threshold value; and generating, by the computer, an output based on the association; and rendering the generated output as overlay data on a display interface associated with the digital environment.

18. The computer program product of claim 17, wherein the function associated with the first tuple and the second tuple comprises a set of ordered triples, wherein each triple of the set of ordered triples is of a form (o1, o2, w), where o1 is the physical object of the physical environment, o2 is the digital object of the digital environment, and w is the weight parameter, and wherein each triple of the set of the ordered triples of the form (o1, o2, w) indicates that a relationship R exists from the physical object o1 to the digital object o2 with a weight corresponding to the weight parameter w.

* * * * *